(12) United States Patent
McCarthy et al.

(10) Patent No.: US 10,583,425 B2
(45) Date of Patent: Mar. 10, 2020

(54) ACTIVATION OF NOBLE METAL CATALYSTS ON SILICEOUS SUPPORTS

(71) Applicant: ExxonMobil Research and Engineering Company, Annandale, NJ (US)

(72) Inventors: Stephen J. McCarthy, Center Valley, PA (US); Paul Podsiadlo, Humble, TX (US); Gary P. Schleicher, Milford, NJ (US); Timothy L. Hilbert, Middleburg, VA (US); Teck-Mui Hoo, Conroe, TX (US); Eric D. Joseck, Spring, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/038,851

(22) Filed: Jul. 18, 2018

(65) Prior Publication Data

US 2019/0039055 A1     Feb. 7, 2019

Related U.S. Application Data

(60) Provisional application No. 62/540,654, filed on Aug. 3, 2017.

(51) Int. Cl.
*B01J 37/10*     (2006.01)
*B01J 37/08*     (2006.01)
(Continued)

(52) U.S. Cl.
CPC ......... *B01J 29/7461* (2013.01); *B01J 8/0285* (2013.01); *B01J 8/0442* (2013.01);
(Continued)

(58) Field of Classification Search
CPC ... B01J 37/10; B01J 37/18; B01J 37/20; B01J 37/08; B01J 37/0018; B01J 38/02;
(Continued)

(56) References Cited

U.S. PATENT DOCUMENTS 3,354,078 A    11/1967  Miale et al.
5,098,684 A     3/1992  Kresge et al.
(Continued)

OTHER PUBLICATIONS

The International Search Report and Written Opinion of PCT/US2018/042692 dated Jan. 11, 2019.
(Continued)

*Primary Examiner* — Lessanework Seifu
(74) *Attorney, Agent, or Firm* — Joseph E. Wrkich; Priya G. Prasad; Ryan L. Lobato

(57) ABSTRACT

Systems and methods are provided for activation of noble metal catalysts that are supported on siliceous supports. The activation method can include limiting the amount of water vapor pressure and/or the time of exposure to the water vapor pressure during heating of the catalyst at temperatures of 50° C. or less. This can be achieved by introducing heated gas into multiple reactors of a multi-reactor system at the same time. A suitable system for introducing heated gas into multiple reactors can correspond to a system with multiple heated hydrogen lines for delivery of heated hydrogen to a plurality of reactors within a multi-reactor system.

16 Claims, 10 Drawing Sheets

(51) Int. Cl.
| | |
|---|---|
| *B01J 29/74* | (2006.01) |
| *B01J 29/068* | (2006.01) |
| *B01J 8/04* | (2006.01) |
| *B01J 38/10* | (2006.01) |
| *B01J 38/06* | (2006.01) |
| *B01J 29/90* | (2006.01) |
| *B01J 35/00* | (2006.01) |
| *B01J 38/02* | (2006.01) |
| *C10G 65/16* | (2006.01) |
| *B01J 8/02* | (2006.01) |
| *B01J 29/04* | (2006.01) |
| *C10G 45/64* | (2006.01) |
| *C10G 45/62* | (2006.01) |
| *C10G 45/00* | (2006.01) |
| *B01J 21/04* | (2006.01) |
| *B01J 23/42* | (2006.01) |
| *B01J 23/44* | (2006.01) |
| *B01J 37/00* | (2006.01) |
| *B01J 37/18* | (2006.01) |
| *C10G 65/02* | (2006.01) |

(52) U.S. Cl.
CPC ............ *B01J 8/0457* (2013.01); *B01J 8/0496* (2013.01); *B01J 21/04* (2013.01); *B01J 23/42* (2013.01); *B01J 23/44* (2013.01); *B01J 29/043* (2013.01); *B01J 29/068* (2013.01); *B01J 29/74* (2013.01); *B01J 29/90* (2013.01); *B01J 35/0066* (2013.01); *B01J 37/0018* (2013.01); *B01J 37/08* (2013.01); *B01J 37/10* (2013.01); *B01J 37/18* (2013.01); *B01J 38/02* (2013.01); *B01J 38/06* (2013.01); *B01J 38/10* (2013.01); *C10G 45/00* (2013.01); *C10G 45/62* (2013.01); *C10G 45/64* (2013.01); *C10G 65/02* (2013.01); *C10G 65/16* (2013.01); *B01J 2229/186* (2013.01); *B01J 2229/36* (2013.01); *B01J 2229/40* (2013.01); *B01J 2229/42* (2013.01); *C10G 2300/703* (2013.01)

(58) Field of Classification Search
CPC ........ B01J 38/06; B01J 38/10; B01J 35/0066; B01J 29/043; B01J 29/068; B01J 29/74; B01J 29/90; B01J 2229/36; B01J 2229/40
See application file for complete search history.

(56) References Cited

U.S. PATENT DOCUMENTS

| | | |
|---|---|---|
| 5,198,203 A | 3/1993 | Kresge et al. |
| 6,156,695 A | 12/2000 | Soled et al. |
| 6,162,350 A | 12/2000 | Soled et al. |
| 6,299,760 B1 | 10/2001 | Soled et al. |
| 6,582,590 B1 | 6/2003 | Riley et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,288,182 B1 | 10/2007 | Soled et al. |
| 7,309,806 B2 | 12/2007 | Loezos et al. |
| 7,407,909 B2 | 8/2008 | McCarthy et al. |
| 7,410,924 B2 | 8/2008 | Canos et al. |
| 7,544,632 B2 | 6/2009 | Soled et al. |
| 7,709,408 B2 | 5/2010 | Canos et al. |
| 8,216,958 B2 | 7/2012 | Wu et al. |
| 8,288,305 B2 | 10/2012 | Bai et al. |
| 8,637,423 B2 | 1/2014 | Wu et al. |
| 8,778,171 B2 | 7/2014 | Oliveri et al. |
| 8,932,454 B2 | 1/2015 | Wu et al. |
| 2005/0277545 A1 | 12/2005 | Shih et al. |
| 2006/0060502 A1 | 3/2006 | Soled et al. |
| 2007/0084754 A1 | 4/2007 | Soled et al. |
| 2008/0132407 A1 | 6/2008 | Bai et al. |
| 2011/0315596 A1 | 12/2011 | Prentice et al. |
| 2013/0092598 A1 | 4/2013 | Joseck et al. |
| 2013/0341243 A1 | 12/2013 | Novak et al. |
| 2015/0275106 A1 | 10/2015 | Vaughn et al. |
| 2015/0321183 A1 | 11/2015 | Guillon et al. |
| 2017/0182484 A1 | 6/2017 | Ide et al. |

OTHER PUBLICATIONS

Weisz et al., "Superactive Crystalline Aluminosilicate Hydrocarbon Catalysts", Journal of Catalysis, 4, 1965, 527-529.
Miale et al., "Catalysis by Crystalline Aluminosilicates IV. Attainable Catalytic Cracking Rate Constants, and Superactivity", Journal of Catalysis, 6, 1966, 278-287.
Olson et al., "Chemical and Physical Properties of the ZSM-5 Substitutional Series", Journal of Catalysis, 61, 1980, 390-396.
The International Search Report and Written Opinion of PCT/US2018/042671 dated Jan. 10, 2019.

ACTIVATION OF NOBLE METAL CATALYSTS ON SILICEOUS SUPPORTS

CROSS-REFERENCE TO RELATED APPLICATIONS

This application claims priority to U.S. Provisional Application Ser. No. 62/540,654 filed Aug. 3, 2017, which is herein incorporated by reference in its entirety.

FIELD

Systems and methods are provided for reduction and/or sulfidation of catalysts including one or more noble metals on a siliceous supports, such as zeolitic supports.

BACKGROUND

Noble metal catalysts are commonly used for a variety of purposes in hydroprocessing environments. Examples of hydroprocessing using noble metal catalysts include, but are not limited to, hydrocracking processes, dewaxing processes, and aromatic saturation/hydrofinishing processes. The catalyst support material for supporting the noble metals can vary depending on the nature of the process.

One of the difficulties with using noble metal catalysts is maintaining the activity of the catalyst between the time of catalyst manufacture and the beginning of hydroprocessing. In particular, after manufacture of a noble metal catalyst, such a catalyst typically needs to be loaded into a reactor and then activated for use. Typical activation procedures can include a reducing step for converting metal oxides to a metal state with a lower oxidation number and/or a sulfiding step for preparing the metal sulfide that is typically considered the active form of a hydroprocessing catalyst.

U.S. Pat. No. 7,407,909 describes methods for ex-situ reduction and dry passivation of noble metal catalysts.

SUMMARY

In various aspects, a method for activating a noble metal catalyst is provided. The method includes heating a catalyst comprising 0.05 wt % to 5.0 wt % of noble metal on a support comprising a metal oxide in the presence of a gas stream comprising at least 0.7 kPa-a of water. The heating can increase the temperature of the catalyst from a temperature of 40° C. or less, such as 30° C. or less, to a temperature of 50° C. or more. In the support, about 20 mol % or more of the metal atoms of the metal oxide can correspond to silicon. Optionally, if the support includes a crystalline metal oxide, about 50 mol % or more of the metal atoms in the crystalline metal oxide can correspond to silicon. Examples of crystalline metal oxides include zeolites such as ZSM-48 and mesoporous crystalline oxides such as MCM-41. The catalyst can have a dispersion of 0.60 or more prior to the heating and the heated catalyst can also have a dispersion of 0.60 or more. The gas stream optionally can optionally include hydrogen, nitrogen, or a combination thereof.

In some aspects, an exposure time can correspond to a time from a start of the heating to the catalyst being at a temperature of 50° C., a time-water product for the exposure time being 40 or less, the time-water product being defined as a product of the water partial pressure in kPa and a square root of the exposure time in hours.

In some aspects, the catalyst can include Pt, Pd, or a combination thereof. In some aspects, the catalyst can include 0.1 wt % to 1.5 wt % of noble metal.

In some aspects, the gas stream can include up to 40 kPa-a of water, such as 3.5 kPa-a to 40 kPa-a. In some aspects, the water in the gas stream can correspond to water desorbed from the catalyst, such as in aspects where the catalyst (such as hydroprocessing catalyst in a catalyst bed) includes 1.0 wt % or more of water prior to the heating. In some aspects, the heating can include heating the catalyst at a rate of 15° C. per hour or less.

In some aspects, the method can further include heating the catalyst from the temperature of 50° C. or more to a temperature of 200° C. or less in the presence of a gas stream comprising 10.5 kPa-a or less of water (or 4.0 kPa-a or less). In some aspects the method can further include heating the catalyst in the presence of a reducing gas stream comprising at least 5 vol % $H_2$ and 2.0 kPa-a or less of water (or 1.4 kPa-a or less) from the temperature of 200° C. or less to a temperature of 200° C. to 250° C.

In various aspects, a multi-reactor reaction system is provided. The system can include one or more heaters comprising one or more heater inlets and one or more heater outlets. The one or more heater inlets can be in fluid communication with a source of a hydrogen-containing gas stream. The system can further include a plurality of reactors. At least two reactors of the plurality of reactors can be in indirect fluid communication with the source of the hydrogen-containing gas stream via at least one heater outlet of the one or more heater outlets. Optionally, the at least two reactors can include one or more catalyst beds comprising hydroprocessing catalyst. The hydroprocessing catalyst optionally comprising a noble metal hydroprocessing catalyst.

In some aspects, the hydroprocessing catalyst can include a support comprising a metal oxide. Optionally, about 20 mol % or more of the metal atoms in the metal oxide can correspond to silicon. Optionally, the metal oxide can correspond to a crystalline metal oxide, and about 50 mol % or more of the metal atoms of the crystalline metal oxide can correspond to silicon.

In some aspects, at least one heater of the one or more heaters can further include a heater feed inlet and a heater feed outlet, a first reactor of the plurality of reactors being in fluid communication with the heater feed outlet.

DETAILED DESCRIPTION OF THE EMBODIMENTS

Overview

Figure 1:
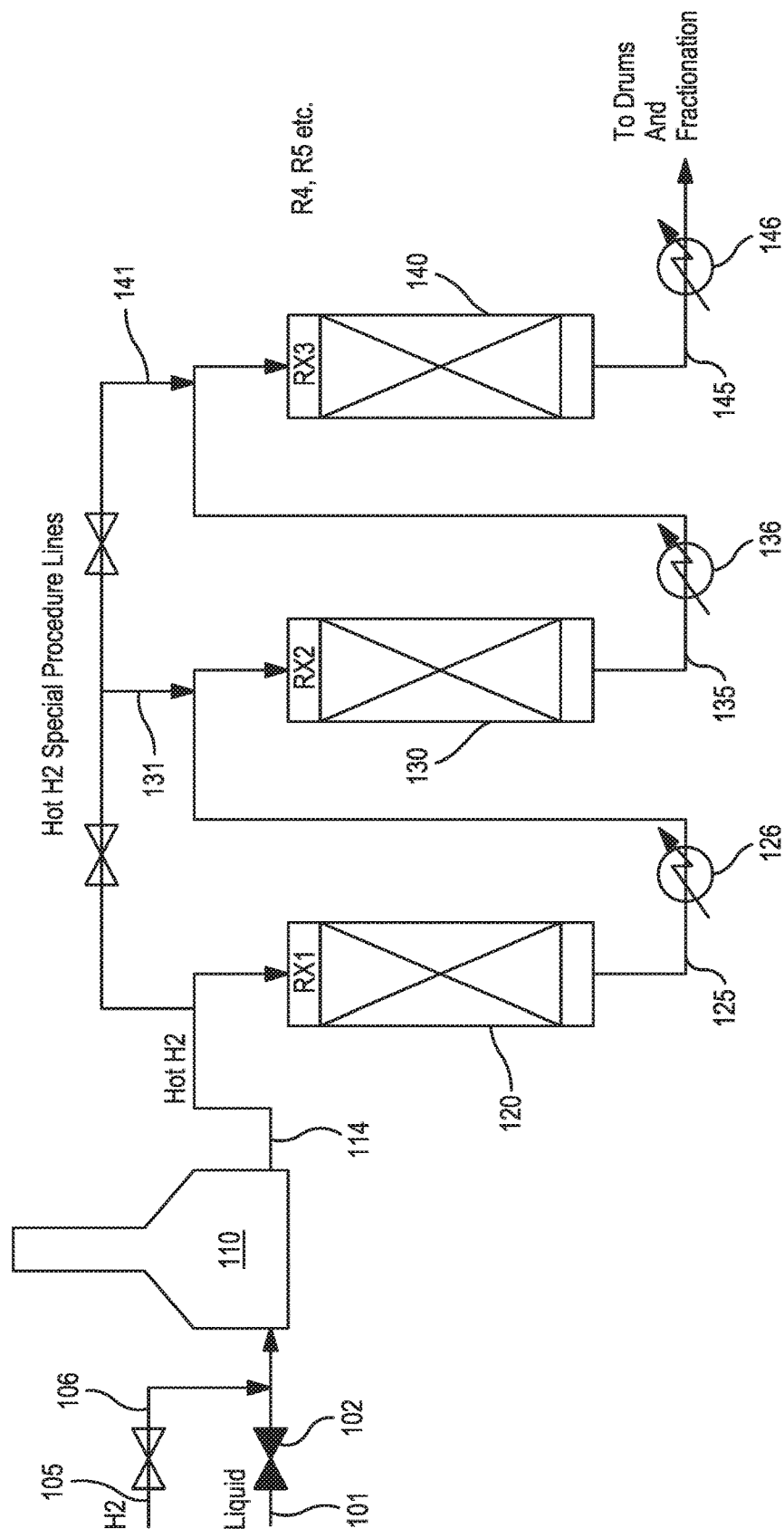
FIG. 1 schematically shows an example of a reaction system including multiple reactors and multiples heated hydrogen lines.

In various aspects, systems and methods are provided for activation of noble metal catalysts that are supported on siliceous supports. It has been discovered that the tolerance of a noble metal catalysts with respect to exposure to water can vary depending on the state of the catalyst. After forming a noble metal catalyst on a siliceous support, the catalyst can typically be stored prior to introduction into a reactor. During this storage period and/or during the period after introduction into a reactor, reducing or minimizing exposure to water can be beneficial. During this period, noble metal catalysts on siliceous supports are susceptible to adsorption of substantial amounts of water on the catalyst, which can result in reduced dispersion of metals on the catalyst. Typically, catalyst introduced into a reactor can be protected prior to catalyst activation by maintaining a blanket of inert gas (such as nitrogen) over the catalyst, where the inert gas blanket has substantially no water content, such as less than 0.001 wt % water.

Catalyst activation can refer to a variety of procedures that are performed after loading a catalyst into a reactor and prior to exposing the catalyst to a hydrocarbon or hydrocarbonaceous stream. Catalyst activation can typically include a heating phase to increase the catalyst temperature to a temperature suitable for the next phase of activation, which may correspond to reducing the catalyst or may correspond to sulfiding the catalyst, depending on the state of the catalyst prior to activation. Optionally, sulfidation of a catalyst can be considered the final phase of an activation process, or sulfidation may occur by exposing the catalyst to a sulfur-containing hydrocarbon stream.

The need to reduce or minimize exposure to water can remain until the catalyst is heated to a sufficiently high temperature, such as heating to at least 35° C. or at least 50° C. After reaching a temperature of 35° C. or more, or 50° C. or more, exposure of the catalyst to water can result in a reduced or minimized amount of water adsorption on the catalyst. This reduced sensitivity to water vapor can continue until the catalyst is sufficiently heated to reach a temperature of roughly 150° C., at which point reduction of metals on the catalyst can start to occur. The temperature prior to the start of heating can be any convenient temperature, such as 40° C. or less, or 30° C. or less, or 25° C. or less, or 20° C. or less.

It has further been discovered that some exposure of water to a noble metal catalyst at low temperatures can be acceptable. The amount of water exposure that can be tolerated at low temperatures can depend on the nature of the catalyst support, the partial pressure of water, and the rate of temperature increase during the exposure to the partial pressure of water. Thus, if the amount of time the catalyst is exposed to water at temperatures below 35° C. and/or below 50° C. is sufficiently minimized, it can be acceptable to allow the catalyst to be exposed to levels of water partial pressure that are typically found in certain types of refinery streams, such as recycled hydrogen-containing streams that may be desirable for use as a reducing agent during exposure of the catalyst to reducing conditions.

In-situ nitrogen drying and hydrogen reduction of noble metal catalysts is sometimes difficult to implement in commercial plants. Conventionally, catalysts must first be completely dried under inert gas ($N_2$) and then the water partial pressure must be maintained at extremely low levels during hydrogen reduction to prevent damaging highly dispersed noble metals. Conventionally, this can correspond to maintaining a partial pressure of water of less than about 0.1 psi-a during the activation procedure. For catalysts in the second or later reactor of a multi-reactor system, maintaining the water partial pressure at a low level can be difficult when a heating process is started. As heated air is introduced into the first reactor, the temperature in the first reactor can increase, leading to desorption of water from catalyst in the first reactor. However, by the time the heated air reaches the second reactor, the temperature of the heated air can be substantially reduced, resulting in little or no initial heating of the second (or later) reactor. However, the catalyst in the second reactor is also exposed to the desorbed water from the first reactor. This can lead to at least localized regions in the second reactor with an increased water partial pressure. In some instances, in an effort to maintain the partial pressure of water in the reactor at a minimal level, such as 0.1 psi-a (0.7 kPa-a) or less, relatively low total gas pressures can be used during heating and/or activation. When such low pressures are used for large catalyst volumes, conventional in-situ activation can last for weeks.

It has been discovered that water partial pressures of greater than 0.1 psi-a (0.7 kPa-a), or greater than 0.5 psi-a (3.4 kPa-a), can be tolerated during catalyst activation so long as the time period of exposure at temperatures below 50° C., or below 35° C., is sufficiently limited. This can assist with catalyst activation in a variety of ways. For example, during initial heating, a gas flow can be introduced into the catalyst bed to assist with heat transfer. Additionally, when the catalyst is being reduced in-situ, a hydrogen-containing treat gas that includes a partial pressure of water can be used as both a gas for heat transfer and as the reducing gas. This can potentially allow an existing refinery stream to serve as the gas for heat transfer and/or the reducing gas.

Without being bound by any particular theory, it is believed that exposing a catalyst to elevated levels of water partial pressure for extended periods of time at low temperatures can lead to loss of dispersion of metals on the surface of a supported noble metal catalyst. Such a loss of metal dispersion can result in a corresponding loss in catalyst activity. By limiting the time of exposure of a catalyst to water at low temperatures, it has been discovered that some exposure of water can occur while retaining desirable levels of metal dispersion for the catalyst.

In addition to the initial time period where a catalyst is being heated to a temperature greater than 35° C. and/or greater than 50° C., the partial pressure of water can also be controlled during reducing of a noble metal catalyst. This additional control can be related to limiting the production of water during the reducing process, so that a "localized" partial pressure of water does not result in a loss of metal dispersion. As the catalyst continues to heat up in preparation for reduction of metal oxides, additional water can be desorbed from a catalyst. During the reducing process, water can be evolved from the catalyst surface as metal oxides are converted to metals and/or metal hydrides. In various aspects, the water partial pressure during heating of a catalyst from 50° C. to 200° C. can be maintained at 1.5 psia or less (~10.5 kPa-a or less), or 0.6 psia or less (~4.0 kPa-a or less). Additionally or alternately, the water partial pressure during heating and/or reducing of the catalyst at temperatures from 200° C. to 250° C. can be maintained at 0.3 psia (~2.0 kPa-a) or less, or 0.2 psia (~1.4 kPa-a or less).

In this discussion, the term "catalyst" is used to refer to both sulfided noble metal catalysts as well as noble metal catalysts in compositional states prior to/other than sulfided, such as a noble metal catalyst in an oxide state, a reduced state, or a combination thereof.

Activation Conditions—Initial Heating of Catalyst

In various aspects, catalyst heating and/or reducing can be performed while exposing the catalyst to partial pressures of water commonly found in refinery gas streams for limited periods of time at temperatures below 50° C. This is in contrast to conventional activation procedures, which attempt to limit the water partial pressure in the heating and/or reducing environment during the full activation process. In this discussion, the temperature of catalyst in a catalyst bed is defined as the average temperature for the catalyst bed. The average temperature can be determined based on the average of the temperature at the bottom of the catalyst bed and the temperature at the top of the catalyst bed.

As an initial starting point for in-situ activation, a catalyst loaded into a reactor will typically be present within the reactor under a blanket of an inert gas, such as nitrogen. The temperature after catalyst loading can typically be an ambient temperature within the refinery, which may correspond to a temperature between 5° C. and 25° C. depending on various factors.

During catalyst activation, an inert gas stream can correspond to a gas stream that contains 0.1 vol % or less of known reducing agents, such as $H_2$, and 0.1 vol % or less of oxidizing agents, such as oxygen. Typically, an inert gas stream can include at least 50 vol % $N_2$, or at least 70 vol % $N_2$. The water content of an inert gas stream is discussed in further detail below. A reducing gas stream (i.e., a gas suitable for reducing a catalyst) can correspond to a gas stream having an $H_2$ content of 5 vol % or more, or 10 vol % or more, or 20 vol % or more. For example, a suitable reducing gas stream can correspond to 5 vol % or more of $H_2$ in $N_2$. Optionally, a gas suitable for reducing a catalyst can contain 1.0 vol % or less of oxidizing agents. It is noted that nitrogen and/or other inert gases may still represent a substantial portion of the volume of a reducing gas stream.

One option for catalyst activation can be to first heat a catalyst using an inert gas that primarily serves as an additional heat transfer agent. This initial heating period can be used, for example, to increase the temperature of the catalyst from an ambient temperature (such as 20° C.) up to any other convenient temperature, such as up to a desired temperature for exposing the catalyst to a reducing agent. Another option can be to use a gas suitable for reducing the catalyst as the gas for heating the catalyst. It is noted that reduction of a noble metal catalyst in the presence of hydrogen typically does not begin until the temperature in a catalyst bed reaches roughly 150° C. At lower temperatures, such as while a catalyst is being heated up to the temperature for the onset of reducing, using a hydrogen-containing gas is similar to using an inert gas or other convenient gas stream that can be used as a heating gas. It is noted that from a practical standpoint, heating of large scale commercial reactors typically requires introduction of heated gas into the reactor volume.

When attempting to activate a noble metal catalyst in-situ in a reactor, the catalyst is typically heated from an ambient temperature (such as 20° C.) up to a temperature suitable for reducing the catalyst (such as 150° C. or more) in the presence of an inert gas. The catalyst can then be exposed to a hydrogen-containing stream to reduce the metals on the noble metal catalyst prior to sulfidation. Optionally, if the catalyst has been pre-reduced, then only the catalyst heating step(s) may be needed prior to sulfiding the catalyst. Conventionally, it is believed that the partial pressure of water needs to be maintained at extremely low levels throughout such an activation process in order to avoid loss of catalyst activity for a noble metal catalyst. This can be difficult in conventional multi-reactor configurations, however, where all of the heated gas and/or hydrogen for a reaction system is into the first reactor (or alternatively a single reactor) of the multi-reactor system. Due to the limitation on where gas can be introduced, the first reactor in the multi-reactor system can heat and/or reduce prior to the start of heating/reducing in a second or later reactor. This can create a situation where catalyst in later reactors is exposed to water desorbed or evolved in the first reactor. This situation can be further exacerbated when a recycle loop is used, such as when exposing the catalyst system to hydrogen.

Due to desorption and production of water within the reactors in a reaction system, the water content in gas streams used for heating and/or reducing of catalysts can have a higher water content within the reactors than the expected water content based on the purity of the input gas flows. Conventionally, problems due to the increase in water content in the gas streams within a reaction system has been overcome by attempting to limit the amount of water desorbed and/or produced, so that the total water content remains at extremely low levels.

In various aspects, instead of limiting the gas streams used for heating to gas streams with extremely low water contents inside the reactors (such as less than 0.7 kPa-a), in various aspects the gas stream(s) used for heat transfer during initial heating of the catalyst can have a partial pressure of water of 40 kPa-a or less, or 30 kPa-a or less, or 25 kPa-a or less, or 20 kPa-a or less, or 15 kPa-a or less. Additionally or alternately, the gas stream used for heat transfer during the initial heating process can correspond to a stream containing a partial pressure of water of 0.7 kPa-a or more, or 3.5 kPa-a or more, or 5.0 kPa-a or more, or 10 kPa-a or more. In some aspects, the stream can contain a partial pressure of water of 0.7 kPa-a to 40 kPa-a, or 0.7 kPa-a to 30 kPa-a, or 3.5 kPa-a to 40 kPa-a. These higher water content streams can be used during catalyst activation by limiting the amount of exposure time for these streams to the catalyst at temperatures below 50° C., or below 35° C. In other aspects, it can be beneficial to limit the partial pressure of water to 25 kPa-a or less, so that the hydrogen-containing stream can contain a partial pressure of water of 0.7 kPa-a to 25 kPa-a, or 0.7 kPa-a to 20 kPa-a, or 3.5 kPa-a to 25 kPa-a.

The length of time a catalyst is exposed to water at temperatures below a threshold temperature (such as 50° C.) while avoiding serious reduction in metal dispersion during activation can be related to the water partial pressure. Due to this relation, it can be convenient to define a single value that is dependent on both the water partial pressure and the length of time the catalyst is exposed to water at less than the threshold temperature. In some aspects, the product of the water partial pressure and the square root of the time of exposure to the water partial pressure at less than a threshold temperature can be determined. This product can be referred to as a time-water product. If the time-water product is less than a specified value, then the exposure to the water should be small enough to avoid severe changes in the dispersion of metal on the catalyst. The specified value refers to a constant that is dependent on the nature of the catalyst and on the threshold temperature. A mathematical representation of the time-water product is provided in Equation (1).

$$\text{time-water product} = (P_{H2O})*(t_{exposure})^{0.5} \quad (1)$$

In Equation (1), $P_{H2O}$ can be the water partial pressure in kPa-a and $t_{exposure}$ can be the time of exposure to $P_{H2O}$ at less than a specified temperature in hours. In situations where $P_{H2O}$ varies within the time of exposure, an integral (or an approximation of an integral) can be used to determine the time-water product. It is noted that the dimension of the time-water product is $<pressure>*<time>^{0.5}$, but within this discussion the dimensions of the time-water product are reported with an assumption of kPa for the pressure and hours for the time. Therefore, values for the time-water product are provided without explicitly reciting the corresponding dimension in this discussion.

In various aspects, the amount of time of exposure of a catalyst to water partial pressure at less than a threshold temperature can be maintained at a sufficiently low level so that the time-water product in Equation (1) is less than a specified value. In some aspects, at a threshold temperature of 35° C., the specified value can be 30 (units are kPa*hour$^{0.5}$). In some aspects, at a threshold temperature of 50° C., the specified value can be 40. For example, if a catalyst is exposed to a water partial pressure of about 14 kPa at a temperature of less than 50° C. for a time of 6 hours, the time-water product is $(14)*(6)^{0.5}=29.7$. This is less than 40, so the loss of metal dispersion should be reduced or minimized. If the water partial pressure was increased to 21 kPa for the 6 hour exposure, the time-water product would be 51.4, which is greater than the specified value of 40 for exposure to water at less than 50° C. However, exposure of the catalyst to 21 kPa of water for a shorter period, such as 2 hours, would result in a time-water product of 29.7, which is less than the specified value of 40. As can be observed from time-water product values in relation to the specified values, some limited exposure of a noble metal catalyst to higher water partial pressures can be acceptable while the catalyst is at a temperature of less than 50° C. (or less than 35° C.), so long as the time length of the exposure is limited.

In order to limit the amount of time a catalyst is exposed to an elevated partial pressure of water, the catalyst can be heated according to a temperature profile for relatively rapid heating of the catalyst. During catalyst activation, the temperature profile for catalyst in a reactor can be characterized based on an average rate of temperature increase, such as a rate of temperature increase per hour. The rate of temperature increase can be defined as the increase in the average temperature of the catalyst, such as an average temperature determined by averaging the temperature at the top of the catalyst bed and the bottom of the catalyst bed. In various aspects, the rate of temperature increase for the catalyst during exposure of the catalyst to a water partial pressure of greater than 0.1 psi-a can be about 1° C./hr or more, or about 3° C./hr or more, or about 5° C./hr or more, or about 8° C./hr or more, or about 10° C./hr or more, such as up to 25° C./hr or possibly still higher. It is noted that the upper limit for the rate of temperature increase is related to practical limits for a given heating method as well as practical considerations for avoiding damage to the catalyst and/or the reactor.

Activation Conditions—Exposing Catalyst to Reducing Conditions

For catalysts that are reduced prior to loading into a reactor, maintaining control of the water partial pressure during heating to a temperature of at least 50° C. can be sufficient to preserve a desired level of dispersion for the noble metals on the catalyst. For catalysts that are not pre-reduced, the time period during the reducing process can also correspond to a time period where metal dispersion can be reduced due to the presence of water.

For noble metal catalysts that are not pre-reduced, the catalyst can typically be in an oxide form prior to activation. The initial heating of the catalyst up to about 150° C. typically does not modify this oxide form. At temperatures of 150° C. or greater, if hydrogen is present, the process of reducing the metals on the catalyst can begin. During the reducing process, the noble metal oxides on the catalyst can be converted to metals and/or metal hydrides. During this process, the oxygen originally present in the noble metal oxides can be converted into water. If the reducing process occurs too quickly, the water generated during the reducing process can be sufficient to cause a loss of metal dispersion on the catalyst.

In order to avoid loss of dispersion, the temperature profile during additional heating of the catalyst (from 50° C. to 150° C., or 50° C. to 200° C.) and/or during reducing of the catalyst (150° C. to 250° C., or 200° C. to 250° C.) can have a sufficiently slow heating rate to avoid excessive water generation during a given time period. During the reducing step, the temperature profile for increasing the catalyst temperature from 150° C. to 250° C. can correspond to an average heating rate of 0.5° C. per hour to 10° C. per hour, or 1.0° C. per hour to 10° C. per hour, or 1.0° C. per hour to 5.0° C. per hour. It is noted that this average heating rate could include one or more time periods where the temperature is held at roughly constant temperature, such as having an initial several hour hold at a temperature of 150° C. Maintaining a slow rate of heating during the initial portions of a reducing process can provide time for water generated during the reducing process to be transported away from the local environment of the catalyst, so that excessive amounts of water do not accumulate in the local environment as the reducing process continues. Additionally or alternately, the partial pressure in the gas streams in the reactors during additional heating (50° C. to 150° C., or 50° C. to 200° C.) can be 1.5 psia or less (~10.5 kPa-a or less), or 0.6 psia or less (~4.0 kPa-a or less). Additionally or alternately, the water partial pressure during heating and/or reducing of the catalyst (150° C. to 250° C., or 200° C. to 250° C.) can be maintained at 0.3 psia (~2.0 kPa-a) or less, or 0.2 psia (~1.4 kPa-a or less).

Noble Metal Catalysts

In this discussion, a noble metal catalyst refers to a supported catalyst that included one or more noble metals supported on a support material. In some aspects, the support material can correspond to a siliceous support, such as an amorphous silica support, a zeolitic support, a bound zeolitic support, or another type of (optionally bound) crystalline metal oxide support where silicon corresponds to about 50 mol % or more of the metal atoms in the crystalline portion of the support. It is noted that a bound crystalline metal oxide support may correspond to a bound support, such as a support bound using an alumina binder or another type of binder. In such aspects, silicon can correspond to about 50 mol % or more of the metal atoms in the crystalline portion of the support and/or silicon can correspond to 20 mol % or more (or 50 mol % or more) of the total metal atoms in the support.

The concentration of metals on a noble metal catalyst is typically low, such as having a noble metal concentration of 0.05 wt % to 5.0 wt %, or 0.1 wt % to 2.0 wt %. The noble metal can correspond to Pt, Pd, another Group VIII noble metal, or a combination thereof. When two or more noble metals are present, the weight ratio of the noble metals can correspond to any convenient ratio, such as a weight ratio of a first noble metal to a second noble metal of at least 9:1, or at least 5:1, or at least 3:1, or at least 2:1, or at least 1:1.

In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

Catalysts can be self-bound and/or can be optionally bound with a separate binder or matrix material prior to use. Binders can be resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. The matrix can be in the form of a co-gel. In some aspects, the base metal dewaxing catalysts can be formulated using a low surface area binder, a low surface area binder represents a binder with a surface area of about 150 m$^2$/g or less, or about 130 m$^2$/g or less, or about 100 m$^2$/g or less, or about 80 m$^2$/g or less, or about 70 m$^2$/g or less.

The amount of zeolite in a support including a binder can be from about 20 wt % zeolite to about 100 wt % zeolite relative to the combined weight of binder and zeolite. For example, the amount of zeolite can be about 30 wt % to about 100 wt %, or about 30 wt % to about 90 wt %, or about 30 wt % to about 80 wt %, or about 30 wt % to about 70 wt %, or about 50 wt % to about 100 wt %, or about 50 wt % to about 90 wt %, or about 50 wt % to about 80 wt %, or about 50 wt % to about 70 wt %, or about 60 wt % to about 90 wt %, or about 60 wt % to about 80 wt %, or about 60 wt % to about 70 wt %.

After combining a zeolite with any optional binder, the zeolite can be extruded to form support particles. Alternatively, support particles may be formed by any other convenient method. After forming support particles, the support particles can be impregnated with the base metal salts using an impregnation solution that also includes a dispersion agent.

Impregnation, such as impregnation by incipient wetness or ion exchange in solution, is a commonly used technique for introducing metals into a catalyst that includes a support. During impregnation, a support is exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be dried to remove excess water. The drying can be performed under any convenient atmosphere, such as air, at a temperature from about 80° C. to about 200° C. Optionally, the catalyst is not calcined prior to sulfidation.

An example of a noble metal catalyst that includes one or more noble metals supported on an (optionally bound) zeolitic support can be a dewaxing catalyst. Suitable dewaxing catalysts can include molecular sieves such as crystalline aluminosilicates (zeolites) and/or other molecular sieves having a zeolitic framework structure. In an aspect, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23.

In various aspects, the dewaxing catalyst can also include a binder for the molecular sieve, such as a mesoporous binder. Examples of suitable binders include, but are not limited to, silica, alumina, silica-alumina, titania, silica-titania, alumina-titania, zirconia, silica-zirconia, titania-zirconia, ceria, tungsten oxide, and combinations thereof, for example alumina, silica, titania, silica-alumina, and combinations thereof.

In some aspects, the additional dewaxing catalyst(s) used in processes according to the invention can be catalysts with a low ratio of silica to alumina in the framework structure. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In other aspects, the ratio of silica to alumina in the ZSM-48 can be a low ratio to allow for enhanced aromatic saturation. In such aspects, the ratio of silica to alumina in ZSM-48 can be 60:1 to 90:1, or 60:1 to 80:1, or 60:1 to 70:1.

In still other aspects, various ratios of silica to alumina may be suitable for enhanced aromatic saturation based on the nature of the framework structure. A lower silica to alumina ratio for a molecular sieve can provide a higher acidity, which is believed to improve aromatic saturation activity. Optionally, a molecular sieve with a lower silica to alumina ratio can correspond to a molecular sieve with a largest pore channel corresponding to a 10-member ring, such as molecular sieves with a framework structure of MRE (ZSM-48), MTT, EUO, AEL, AFO, SFF, STF, or TON. In such aspects, a lower silica to alumina ratio can correspond to a silica to alumina ratio of 30:1 to 40:1, or 40:1 to 50:1, or 50:1 to 60:1, or 60:1 to 70:1.

In various aspects, a dewaxing catalyst can further include a metal hydrogenation component. The metal hydrogenation component can typically be a Group VI and/or a Group VIII metal, such as a Group VIII noble metal. For example, the metal hydrogenation component can be Pt, Pd, or a mixture thereof.

The metal hydrogenation component may be added to a catalyst in any convenient manner. One technique for adding the metal hydrogenation component is by incipient wetness. For example, after combining a zeolite (and/or other molecular sieve) and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of molecular sieve (or molecular sieve and binder) prior to extrusion.

The amount of metal in a dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %.

In aspects where a dewaxing catalyst includes a binder, the dewaxing catalyst can optionally be formulated using a low surface area binder, a low surface area binder represents a binder with a surface area of 100 $m^2/g$ or less, or 80 $m^2/g$ or less, or 70 $m^2/g$ or less). The amount of zeolite (and/or other molecular sieve) in a catalyst formulated using a binder can be from 30 wt % zeolite to 90 wt % zeolite or even up to about 100 wt % zeolite relative to the combined weight of binder and zeolite.

In some aspects, the ratio of molecular sieve to binder in a catalyst can be selected to provide improved aromatic saturation activity. In such aspects, the ratio of molecular sieve to binder by weight can be at least 75:25, or at least 80:20. Optionally but preferably, the ratio of molecular sieve to binder by weight can be 75:25 to 85:15, or 80:20 to 85:15. Optionally, an increased ratio of molecular sieve to binder can also provide a lower density for the catalyst. In various aspects, a catalyst with a ratio of molecular sieve to binder by weight of at least 75:25 can have a density of 0.52 g/cc or less, or 0.50 g/cc or less, or 0.48 g/cc or less.

A zeolite (and/or other molecular sieve) can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Another example of a noble metal catalyst can be a hydrofinishing or aromatic saturation catalyst. One option for a hydrofinishing catalyst is a catalyst that includes Pt, Pd, or a combination thereof on a support such as alumina, silica, or titania. This includes conventional hydrotreating catalysts with Pt or Pd supported on alumina. The catalyst can include from 0.1 wt % to 5.0 wt % of hydrogenation metal relative to the weight of the support.

Another suitable type of hydrofinishing catalyst can be a catalyst based on the M41S family of catalyst supports, such as MCM-41, MCM-48, or MCM-50. In some aspects, an aromatic saturation (hydrofinishing) catalyst can comprise, consist essentially of, or be a Group VIII and/or Group VIB metal on a support material, e.g., an amorphous support such as a bound support from the M41S family, for instance bound MCM-41. The M41S family of catalysts can be described as mesoporous materials having relatively high silica contents, e.g., whose preparation is further described in *J. Amer. Chem. Soc.,* 1992, 114, 10834. Examples of M41S materials can include, but are not limited to MCM-41, MCM-48, MCM-50, and combinations thereof. Mesoporous is understood to refer to catalysts having pore sizes from 15 Angstroms to 100 Angstroms. A preferred member of this class is MCM-41, whose preparation is described, e.g., in U.S. Pat. No. 5,098,684. MCM-41 is an inorganic, porous, non-layered phase having a hexagonal arrangement of uniformly-sized pores. The physical structure of MCM-41 is similar to a bundle of straws, in which the opening of the straws (the cell diameter of the pores) ranges from 15-100 Angstroms. MCM-48 has a cubic symmetry and is described, for example, in U.S. Pat. No. 5,198,203. MCM-50 has a lamellar structure.

MCM-41 can be made with different size pore openings in the mesoporous range. Preferably, an MCM-41 catalyst can have an average pore size of 40 angstroms or less, such as 25 angstroms or less. The content of framework molecules in an MCM-41 catalyst can also vary. The framework of the MCM-41 can include silica, in combination with alumina, titania, or zirconia. The ratio of silica to alumina, titania, or zirconia in the framework can vary from as high as 800:1 to as little as 25:1.

If binders are desired to be used, suitable binders for the M41S family, and specifically for MCM-41, can include alumina, silica, titania, silica-aluminas, or a combination thereof. With some types of binders, relatively high specific surface areas are possible with MCM-41 type catalysts, such as catalyst surface areas of at least 600 $m^2/g$, or at least 750 $m^2/g$, or at least 850 $m^2/g$, or at least 950 $m^2/g$. Preferably, binders providing a lower surface area can be selected, such as binders that provide a catalyst surface area of 650 $m^2/g$ or less, or 550 $m^2/g$ or less. Low surface area alumina or titania binders are options for producing a MCM-41 type catalyst with a reduced surface area.

One example of a suitable aromatic saturation catalyst is an alumina-bound mesoporous MCM-41 with a supported hydrogenation metal thereon/therein, e.g., Pt, Pd, another Group VIII metal, a Group VIB metal, or a mixture thereof. Individual hydrogenation metal embodiments can include, but are not limited to, Pt only or Pd only, while mixed hydrogenation metal embodiments can include, but are not limited to, combinations of Pt and Pd. When present, the amount of Group VIII hydrogenation metal(s) can be at least 0.1 wt % based on the total weight of the catalyst, for example at least 0.5 wt % or at least 0.6 wt %. Additionally or alternately, the amount of Group VIII hydrogenation metal(s) can be 5.0 wt % or less based on the total weight of the catalyst, for example 3.5 wt % or less, or 2.5 wt % or less, or 1.5 wt % or less, or 1.0 wt % or less, or 0.9 wt % or less, or 0.75 wt % or less, or 0.6 wt % or less. Further additionally or alternately, the total amount of hydrogenation metal(s) can be at least 0.1 wt % based on the total weight of the catalyst, for example at least 0.25 wt %, or at least 0.5 wt %, or at least 0.6 wt %, or at least 0.75 wt %, or at least 1 wt %. Still further additionally or alternately, the total amount of hydrogenation metal(s) can be 35 wt % or less based on the total weight of the catalyst, for example 30 wt % or less, or 25 wt % or less, or 20 wt % or less, or 15 wt % or less, or 10 wt % or less, or 5 wt % or less.

Examples of Reaction Systems for Noble Metal Catalyst Activation

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system corresponds to the one or more stages, such as two stages and/or reactors and an optional intermediate separator, that are used to expose a feed to a plurality of catalysts under hydroprocessing conditions. The plurality of catalysts can be distributed between the stages and/or reactors in any convenient manner, with some preferred methods of arranging the catalyst described herein.

FIG. 1 schematically shows an example of a reaction system for catalyst activation of a noble metal catalyst. The configuration in FIG. 1 provides an example of a reaction system that can independently heat multiple reactors within a reaction system. This is in contrast to conventional reaction systems, where typically a single hydrogen inlet and/or inert gas inlet is used when heating the reaction system. If only a single inlet is used for heating a multi-reactor system, the temperature of the first reactor can initially increase during heating, but a lag will occur between the start of heating in the initial reactor and the start of heating in the downstream reactors. During this lag time as the initial reactor heats up, any water vapor present in the heating gas will still be passed through the system. This can create a situation in a conventional reaction system where downstream catalysts with noble metals are exposed to undesirable levels of water partial pressure while still at a temperature below 50° C., or below 35° C. By contrast, in the configuration shown in FIG. 1, each reactor can be independently heated at the same time. This can reduce or minimize the time each reactor spends at a temperature below 50° C. (or below 35° C.) during a startup process.

In FIG. 1, a hydrogen input stream from a hydrogen source 105 is passed through valve 106 into a heater 110. In the configuration shown in FIG. 1, hydrogen input stream 105 and feed 101 are shown as being combined prior to entering the heater to form a single heated output stream 114. In other aspects, multiple heated output streams 114 can be used, such as a first heated output stream containing heated hydrogen and a second heated output stream containing heated feed. More generally, it is understood that any convenient number of input and/or output streams can be used in conjunction with one or more heaters 110 for forming heated feed streams and heated hydrogen stream. It is noted that valves 106 and 102 can be used to control when hydrogen 105 and feed 101, respectively, are passed through heater 110 to form heated output stream 114. For example, as shown in FIG. 1, if valve 106 is open and valve 102 is closed, then heated output stream 114 can correspond to a heated hydrogen stream.

The heated hydrogen in heated output stream 114 can be used for a variety of purposes. When desired, heated hydrogen from heated output stream 114 can be passed into first reactor 120. Additionally, second heated hydrogen stream 131 and third heated hydrogen stream 141 can be optionally introduced into the second reactor 130 and third reactor 140, respectively. These optional hydrogen streams can be introduced at any convenient time. Thus, the optional hydrogen lines can be used prior to feed processing, such as during catalyst activation; during feed processing, such as to facilitate independent control over temperatures in the reactors in a reaction system; or after feed processing, such as for regeneration of a catalyst. In FIG. 1, reactors 120, 130, and 140 can represent any convenient type of reactors suitable for processing a feed in the presence of hydrogen and a catalyst. The catalysts in reactors 120, 130, and 140 can be the same or different. Optionally, at least one of reactors 120, 130, and 140 can contain a noble metal catalyst having a highly siliceous support. More generally, any convenient number of reactors can be present, such as a plurality of reactors.

During operation of the reactors for processing of a feed, feed 101 and hydrogen 105 from heated output 114 can be introduced into reactor 120. The hydroprocessing in reactor 120 can result in a hydroprocessed effluent 125. Optionally, at least a portion of the hydroprocessed effluent 125 can be passed through a heat exchanger 126 and/or another heating or cooling device for adjustment of the temperature of hydroprocessed effluent 125. The hydroprocessed effluent 125, after optional temperature adjustment, can then be passed into reactor 130. The hydroprocessing in reactor 130 can result in a second hydroprocessed effluent 135. Optionally, at least a portion of the second hydroprocessed effluent 135 can be passed through a heat exchanger 136 and/or another heating or cooling device for adjustment of the temperature of the second hydroprocessed effluent 135. The second hydroprocessed effluent 135, after optional temperature adjustment, can then be passed into reactor 140 for processing to form third hydroprocessed effluent 145. After optional temperature adjustment 146, the third hydroprocessed effluent 145 can be further processed, fractionated, stored in drums, or disposed of/used in any convenient manner.

It is noted that the additional heated hydrogen lines, represented by heated hydrogen lines 131 and 141 in FIG. 1, can enable other types of processing within a reaction system in addition to catalyst activation. As an example, a hypothetical system could include noble metal catalysts in both reactor 130 and reactor 140, such as a noble metal dewaxing catalyst in reactor 130 and a noble metal hydrofinishing catalyst in reactor 140. For such a reaction system, process "upsets" can occur from time to time, where an undesirable feed and/or a less than full processed feed may be able to enter downstream reactors, such as reactors 130 and 140. When such a process upset occurs, the undesirable feed may contaminate the catalyst beds in the reactors, and this may cause catalyst deactivation and/or poisoning. In order to restore catalyst activity, it may be desirable to expose the catalysts in the reaction system to a cleaning feed at an elevated temperature. However, if the only heat source available is the heater for the feed into the initial stage, as the cleaning feed passes through the reactors, the feed will lose temperature and can be substantially cooler by the time the feed reaches the final reactor in a reaction system. One option could be to increase the cleaning feed temperature into the initial reactor, but temperatures above roughly 385° C. could lead to thermal cracking and coking in the presence of a catalyst, which can place effective limits on the temperature in the final reactor(s). Having independent heated hydrogen lines can assist with achieving higher temperatures during a regeneration or cleaning cycle without having to risk catalyst coking in earlier reactors.

The flow paths in FIG. 1 can represent fluid communication between the components. Fluid communication can refer to direct fluid communication or indirect fluid communication. Indirect fluid communication refers to fluid communication where one or more intervening process elements are passed through for fluids (and/or solids) that are communicated between the indirectly communicating elements. For example, vacuum distillation tower 130 is in indirect fluid communication with hydrogen source 105 via heater 110.

EXAMPLES

In the following examples, various catalysts were exposed to a hydrogen-containing treatment gas (100 vol % $H_2$) at a pressure of 500 psi-a (~3.5 MPa-a). The initial starting temperature for the samples was roughly 20° C. During exposure to the hydrogen-containing gas, the samples were heated at various rates. Typical heating rates were 5° C. per hour or 15° C. per hour. Water partial pressures from 2 psi-a (13.8 kPa-a) to 8 psi-a (55.2 kPa-a) were investigated.

Two types of noble metal catalysts on siliceous supports were investigated as representative examples. A first type of catalyst corresponded to a dewaxing catalyst including Pt on alumina-bound ZSM-48. The ratio of zeolite to binder (by weight) was 65 to 35. The catalysts had either 0.6 wt % Pt or 0.3 wt % Pt supported on the catalyst. The silica to alumina ratio of the ZSM-48 varied from 70:1 to 90:1. A second type of catalyst corresponded to a hydrofinishing catalyst including Pt and Pd supported on alumina-bound MCM-41. Although MCM-41 is not strictly a zeolite, it is an example of a siliceous support, as it has a crystalline structure composed primarily of silica. The ratio of MCM-41 to binder (by weight) was 65 to 35. The catalysts either had a) 0.3 wt % Pt and 0.9 wt % Pd or b) 0.15 wt % Pt and 0.45 wt % Pd supported on the support.

In order to characterize the impact of exposure to water, the dispersion of metal on the surfaces of the catalysts was determined before and after exposure. For the ZSM-48 catalysts (Pt only on support), hydrogen chemisorption was used to determine dispersion. For the MCM-41 catalysts that also included Pd on the support, oxygen chemisorption was used. It was observed that catalysts with good activity for intended purpose (such as dewaxing or hydrofinishing) corresponded to catalysts with a metal dispersion of 0.6 or higher. The hydrogen chemisorption and oxygen chemisorption tests were carried out according to the following procedure: Samples were characterized using a Micromeritic ASAP™ 2020. The specific measurements are Quantity of adsorbed gas/Quantity of potentially available metal surface, which can also be expressed as % dispersion or metallic surface area. After exposure of a sample to heating and/or reducing profiles including various amounts of water, the samples were heated to 250° C. in the presence of an inert gas (helium) at a temperature ramp rate of 10° C. per minute, followed by maintaining the temperature at 250° C. in the presence of the inert gas for 60 minutes. The catalysts were then exposed to $H_2$ at 250° C. for 60 minutes. The test apparatus was then evacuated to remove the hydrogen, along with cooling to 35° C. The samples were then exposed to either $H_2$ or $O_2$ at 35° C. to determine an adsorption isotherm.

During the experimental runs, it was generally found that the ZSM-48 catalysts had a higher tolerance for exposure to water at temperatures below 50° C. while still maintaining a dispersion of 0.6 or higher. It was also generally observed that pre-reduced catalysts had a higher tolerance for exposure to water at temperatures below 50° C. while maintaining a dispersion of 0.6 or higher.

Figure 2:
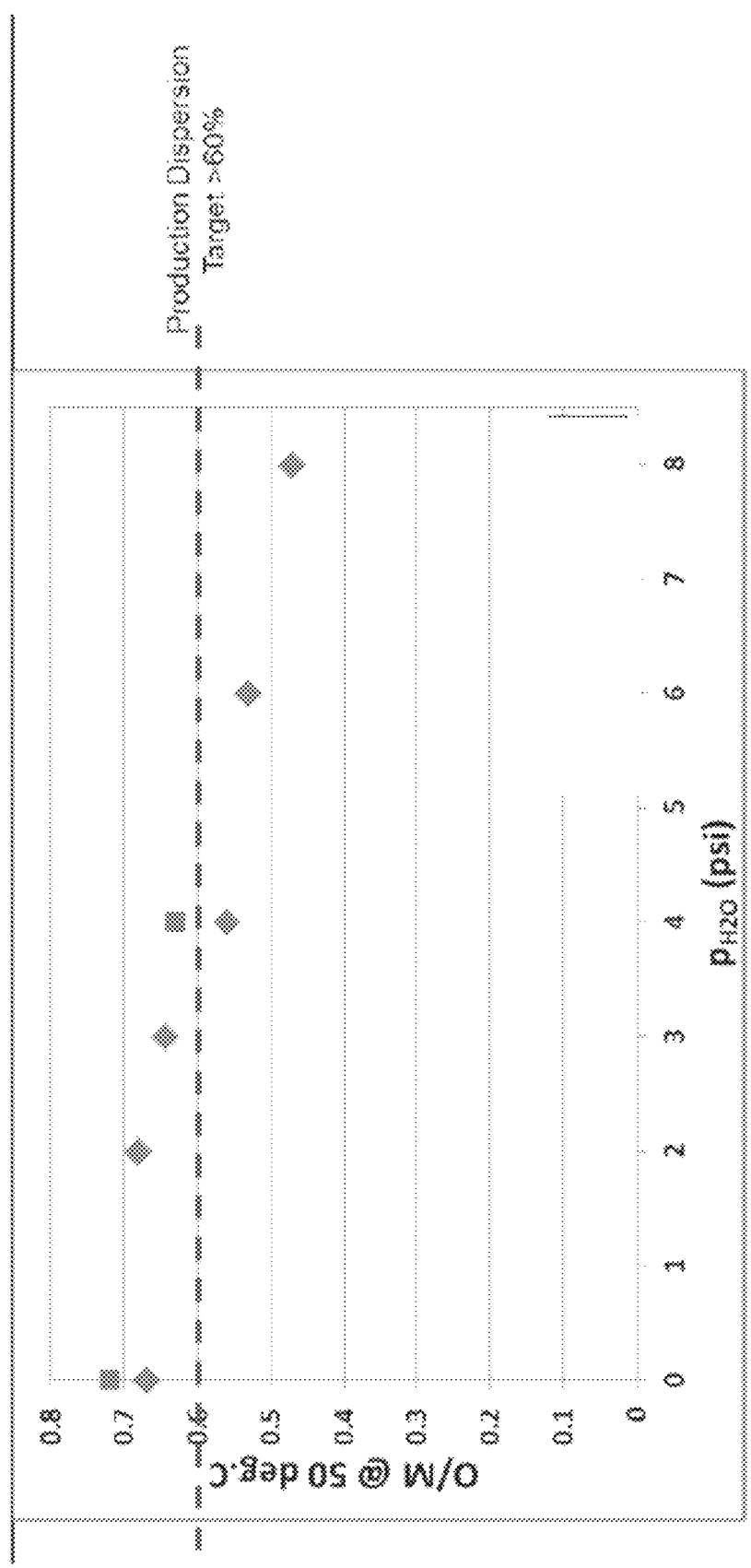
FIG. 2 shows metal dispersion values for various catalysts including a noble metal on a siliceous support that were heated while being exposed to gas streams containing various partial pressures of water.

FIG. 2 shows an example of dispersion results obtained from testing of two types of MCM-41 catalysts with Pt and Pd supported on the surface. The square data points correspond to dispersion amounts for MCM-41 with 0.3 wt % Pt and 0.9 wt % Pd, while the diamond data points corresponds to 0.15 wt % Pt and 0.45 wt % Pd supported on MCM-41. The catalysts were exposed to the partial pressure of water indicated on the horizontal axis under the exposure conditions described above (3.5 MPa-a, initial temperature 20° C., temperature ramp rate of 15° C. per hour). As shown in FIG. 1, both types of catalysts retained a metal dispersion value of greater than 0.60 at water partial pressures of 3 psi (20.7 kPa) and less. Above 20.7 kPa, the MCM-41 with 0.3 wt % Pt and 0.9 wt % Pd showed less than 0.60 dispersion.

Figure 3:
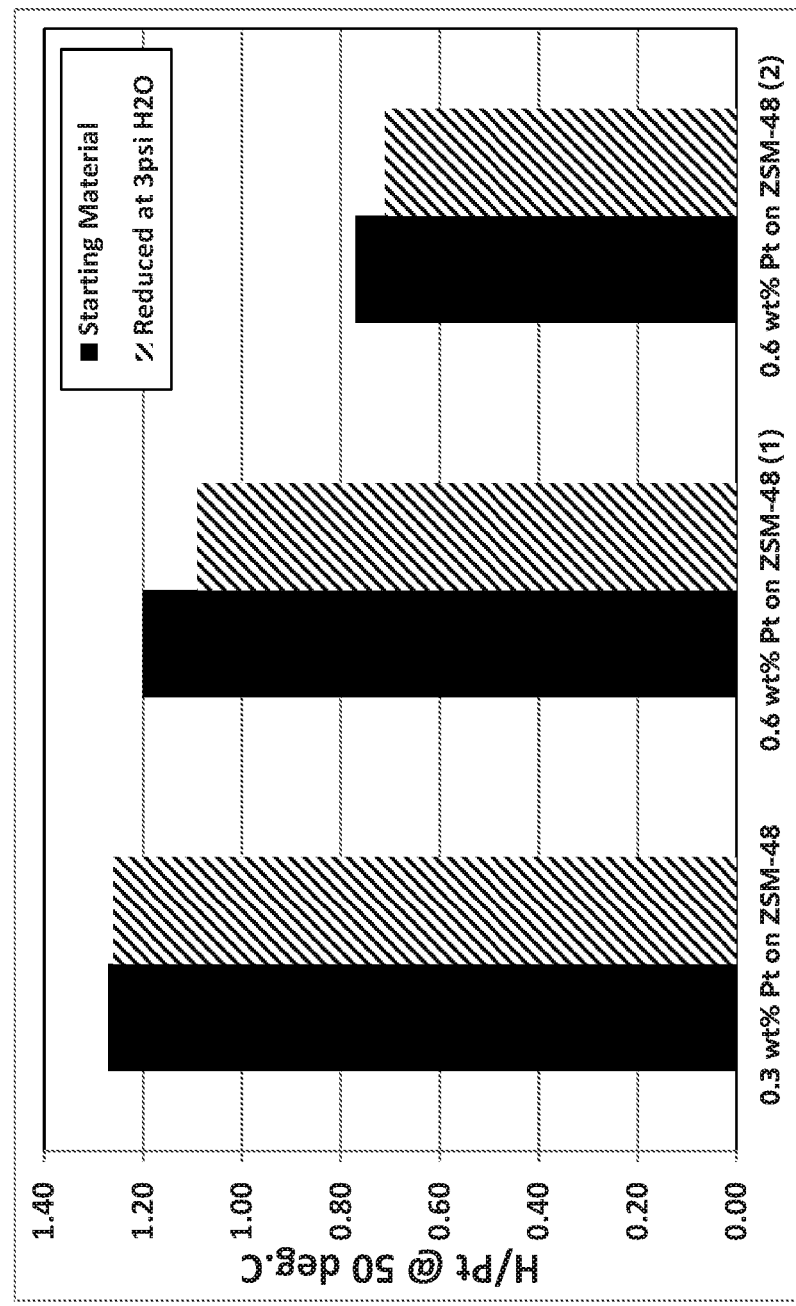
FIG. 3 shows metal dispersion values for catalysts including a noble metal on a siliceous support that were reduced in the presence of a gas stream containing a partial pressure of water.
Figure 4:
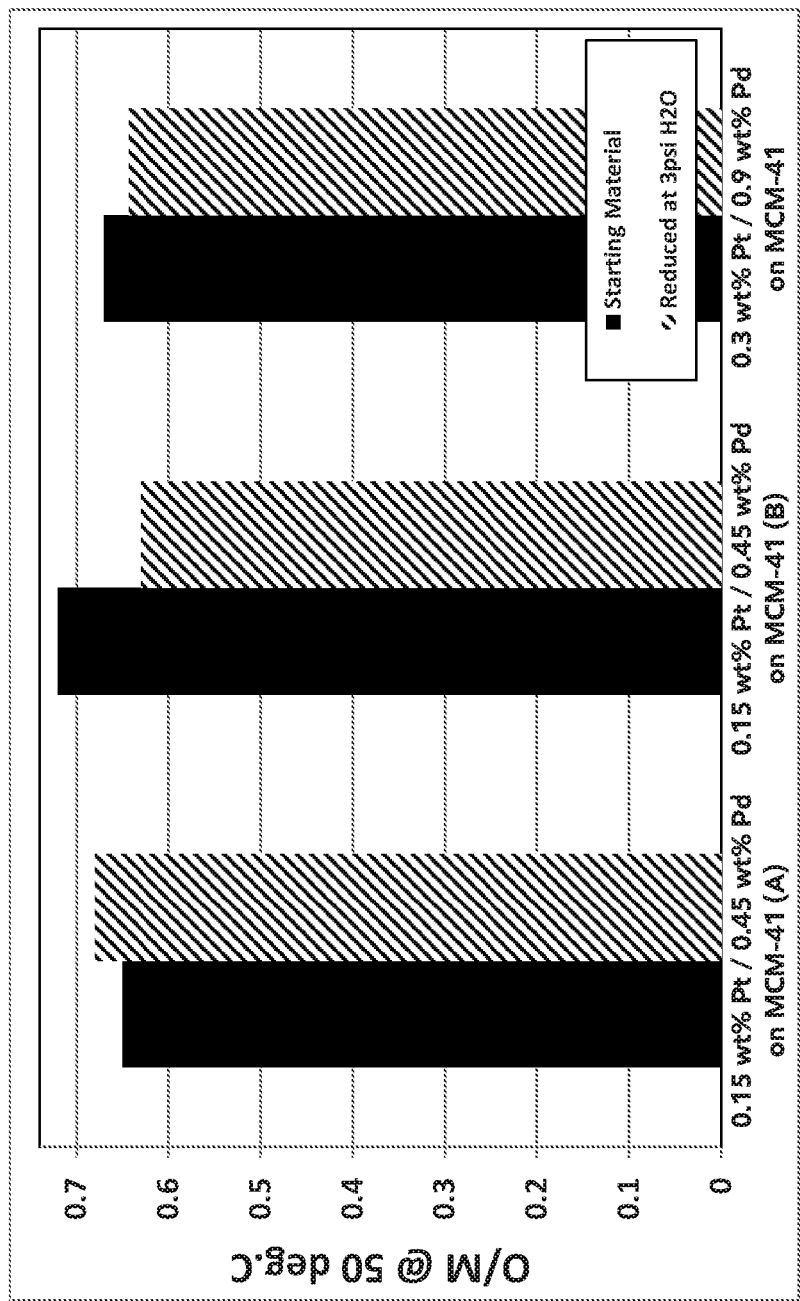
FIG. 4 shows metal dispersion values for catalysts including a noble metal on a siliceous support that were reduced in the presence of a gas stream containing a partial pressure of water.

FIGS. 3 and 4 show additional results from both ZSM-48 catalysts and MCM-41 catalysts that were exposed to a water partial pressure of 20.7 kPa during a 15° C./hour temperature ramp, with a starting temperature of 20° C. It is noted that two separate samples of ZSM-48 were investigated that included 0.6 wt % Pt. Similarly, two separate samples of MCM-41 were investigated that included 0.15 wt % Pt and 0.45 wt % Pd. As shown in FIGS. 3 and 4, all of the samples had a dispersion of greater than 0.60 both before and after exposure to the water partial pressure. Based on a temperature ramp rate of 15° C./hour, the catalysts in FIGS. 3 and 4 were exposed to the water partial pressure of 20.7 kPa at 50° C. or less for a time period of roughly 2 hours. This corresponds to a time-water product of about 29. Based on the results in FIGS. 3 and 4, it appears that the noble metal catalysts can maintain a desired dispersion of 0.60 or more when exposed to 20.7 kPa of water for 2 hours or less.

Figure 5:
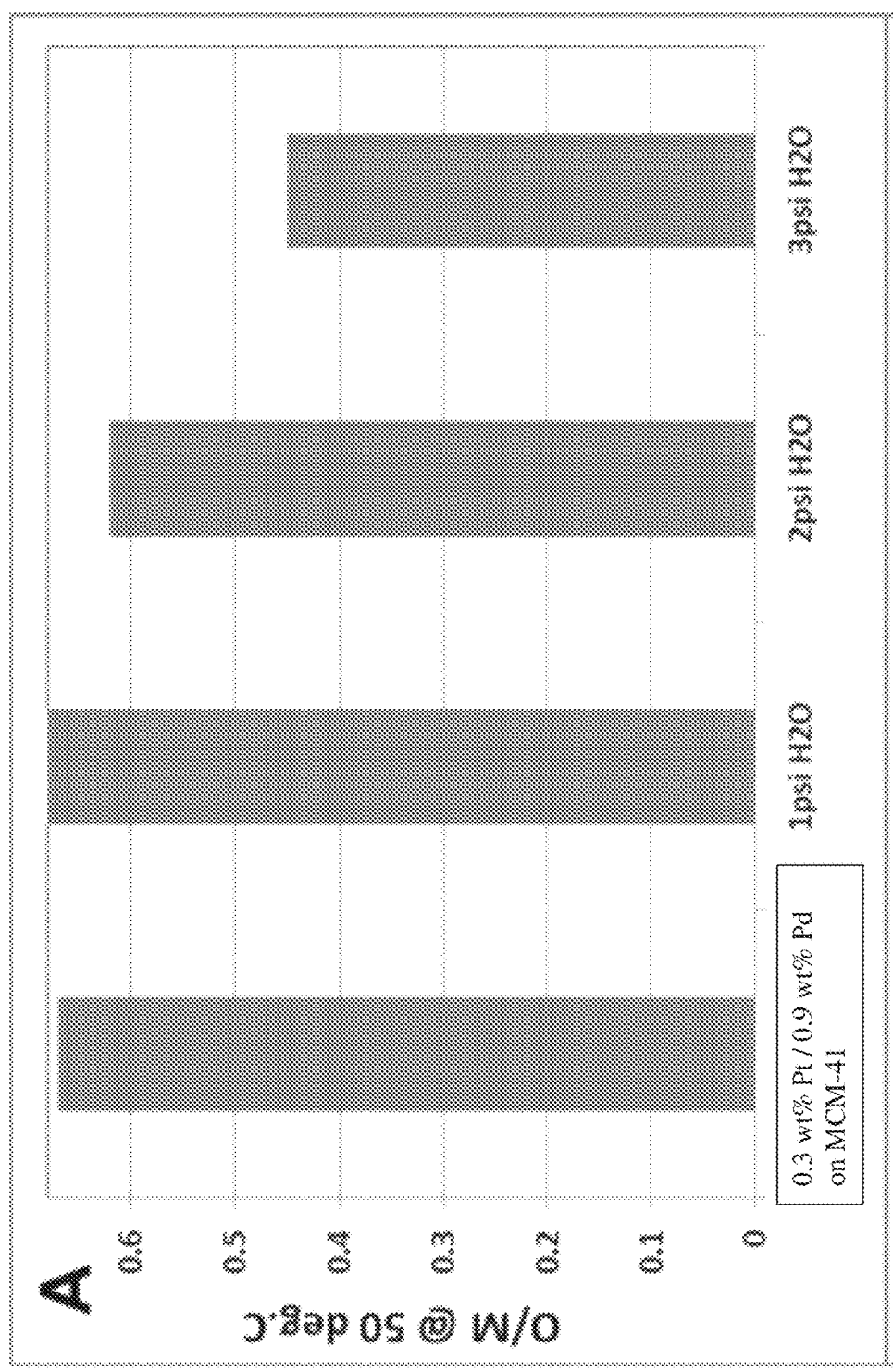
FIG. 5 shows metal dispersion values for catalysts including noble metal on a siliceous support that were reduced in the presence of gas streams containing various partial pressures of water.
Figure 6:
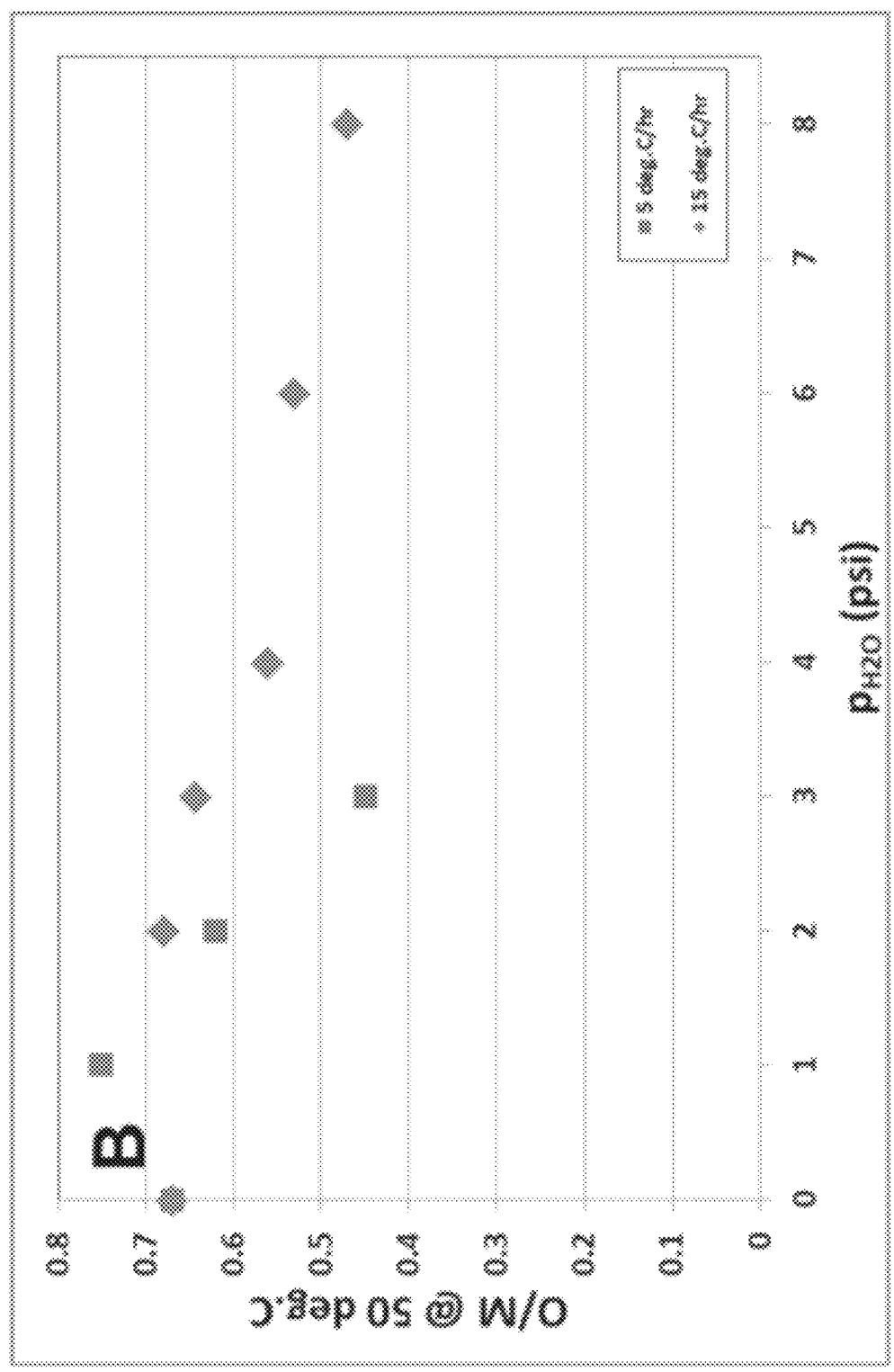
FIG. 6 shows metal dispersion values for various catalysts including a noble metal on a siliceous support that were heated at various heating rates while being exposed to gas streams containing various partial pressures of water.
Figure 7:
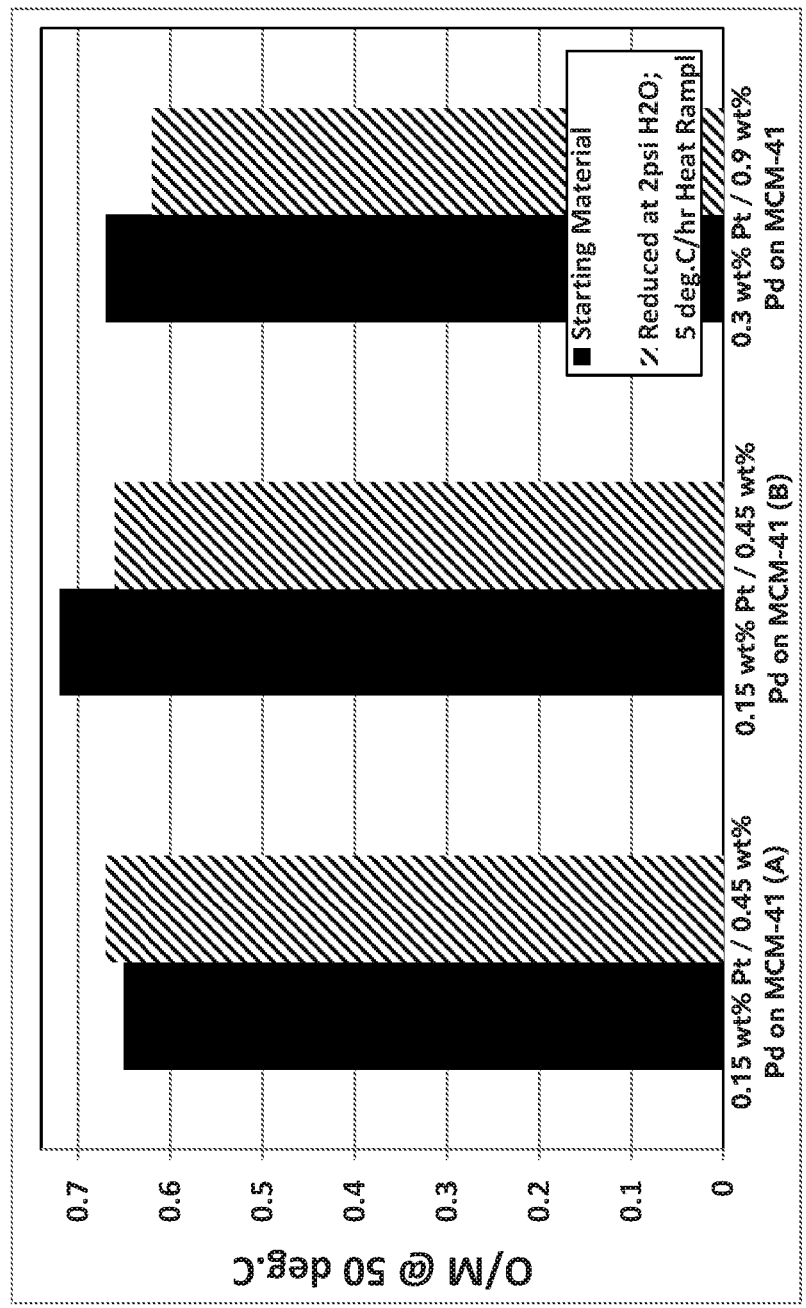
FIG. 7 shows metal dispersion values for catalysts including a noble metal on a siliceous support that were reduced in the presence of a gas stream containing a partial pressure of water.

Based on a comparison of FIGS. 3 and 4, it appeared that the MCM-41 catalyst had a greater sensitivity to exposure to water, so additional tests were performed at other combination of water partial pressure and temperature ramp rate. FIG. 5 shows results from additional tests on MCM-41 with 0.3 wt % Pt and 0.9 wt % Pd at a temperature ramp rate of 5° C./hour. Using this temperature profile, the catalyst was exposed to the partial pressures of water indicated in the figure for roughly 6 hours before reaching a temperature of 50° C. At this longer exposure time, exposure of the catalyst to 20.7 kPa of water partial pressure reduced the metal dispersion on the catalyst to less than 0.60. The dispersion remained above 0.60 for exposure at both 6.9 and 13.8 kPa of water partial pressure. This demonstrates that both length of exposure and the pressure during exposure are factors in determining whether a catalyst can retain a dispersion of greater than 0.60 after exposure to a water partial pressure. This can also be seen in FIG. 6, which compares the metal dispersion values for an MCM-41 catalyst with 0.3 wt % Pt and 0.9 wt % Pd after exposure to the indicated partial pressure of water for either 2 hours (15° C./hour ramp rate) or 6 hours (5° C./hour ramp rate). FIG. 7 shows that all of the types of MCM-41 catalysts shown in FIG. 4 maintain a dispersion of greater than 0.60 when exposed to 13.8 kPa of water at the 5° C./hour ramp rate.

Figure 8:
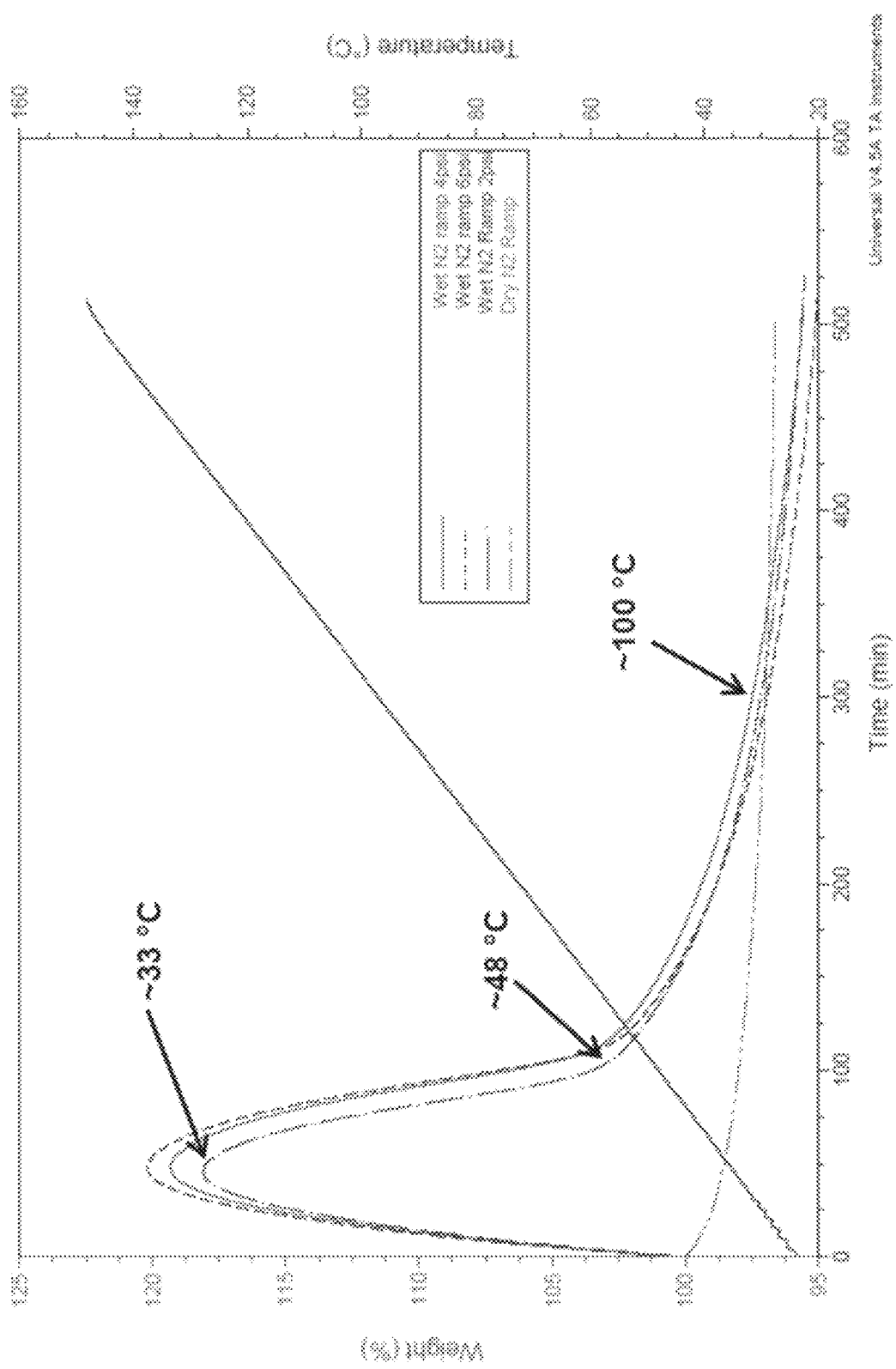
FIG. 8 shows thermogravimetric analysis of water uptake and desorption for catalysts exposed to gas streams containing various partial pressures of water.

In order to further investigate the nature of water uptake on the MCM-41 catalysts, a series of tests were performed using an MCM-41 catalyst with 0.3 wt % Pt and 0.9 wt % Pd supported on the catalyst. The catalysts were heated at a ramp rate of 15° C./hour in the presence of nitrogen streams containing no water, 13.8 kPa of water, 27.6 kPa of water, or 41.4 kPa of water. The results from the exposure of the catalysts to the various partial pressures of water during initial heating are shown in FIG. 8. The lowest line in the plot corresponds to the dry nitrogen. For dry nitrogen, heating of the catalyst results in a small amount of weight loss as the temperature is increased. This is believed to correspond to loss of water that was adsorbed on the catalyst prior to starting the test. The remaining lines in the plot have similar shapes. For the remaining lines with similar shape, the line with the lowest weight gain corresponds to the catalyst exposed to 13.8 kPa of water, while the line with the highest weight gain corresponds to the catalyst exposed to 41.4 kPa of water. This shows that even at a relatively fast temperature ramp rate, the MCM-41 catalyst can gain roughly an extra 10 wt % of water weight. Without being bound by any particular theory, it is believed that this additional adsorbed water, if allowed to remain on the catalyst, can facilitate agglomeration of metals on the catalyst surface and/or otherwise lead to reduced dispersion.

Figure 9:
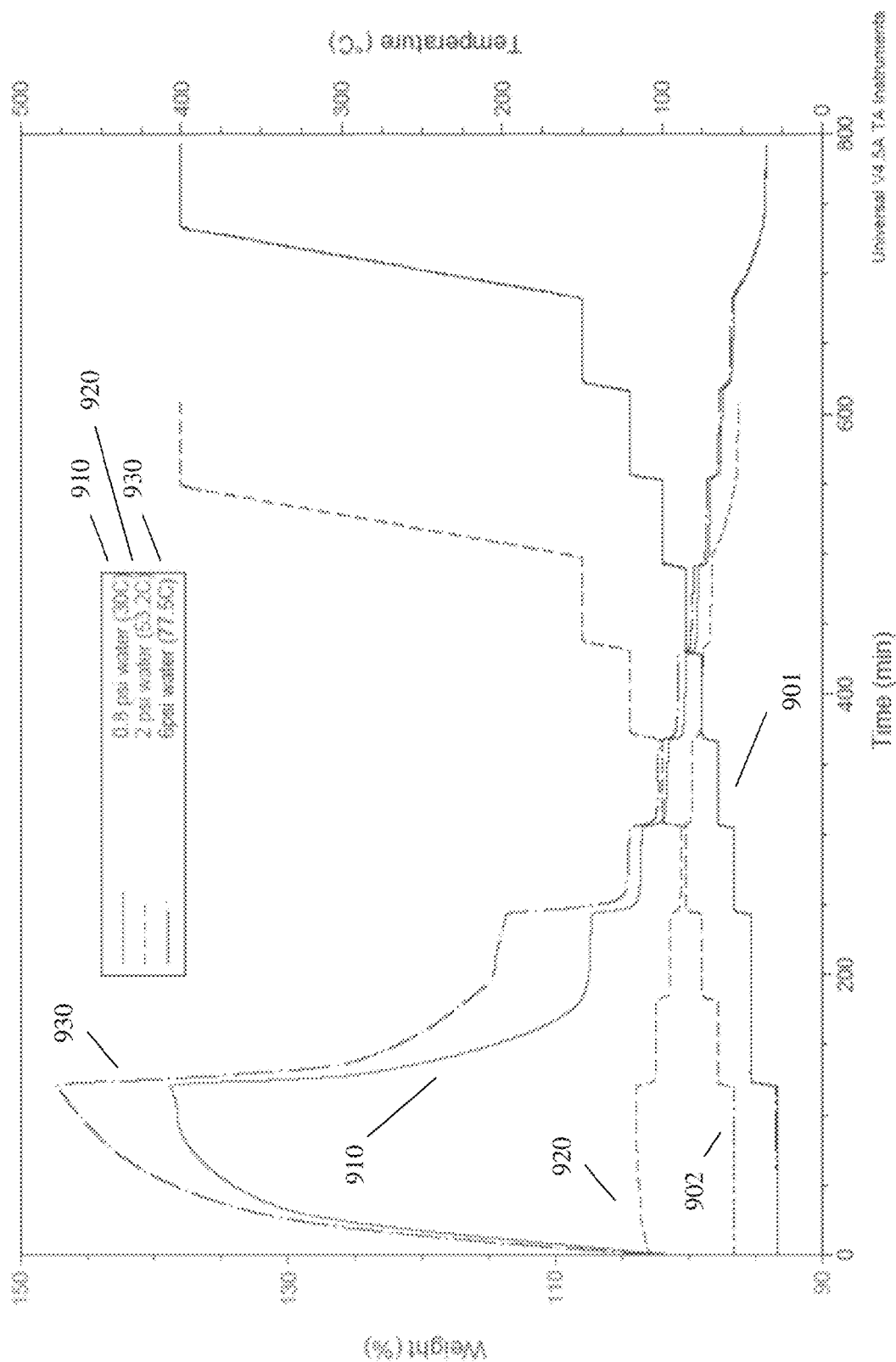
FIG. 9 shows thermogravimetric analysis of water uptake and desorption for catalysts exposed to gas streams containing various partial pressures of water.

To further investigate this water adsorption, MCM-41 catalysts with 0.3 wt % Pt and 0.9 wt % Pd were exposed to different heating profiles. Two catalyst samples were exposed to nitrogen streams containing either 5.6 kPa or 41.4 kPa at the start of heating while being exposed to heating profile 901. A third sample was heated initially to 55° C. according to heating profile 902, without exposure to a nitrogen stream, which meant that no water was present in the environment. After reaching 55° C., heating continued while exposing the catalyst to a nitrogen stream including 13.8 kPa of water. The heating ramp rate during exposure to the water-containing nitrogen streams is shown in FIG. 9, along with the water adsorption. As shown in FIG. 9, once the water-containing nitrogen streams were introduced, the heating ramp rate involved holds at a temperature for a period of 1 or 2 hours, followed by increases in temperature by roughly 15 degrees. For the samples exposed to water at a starting temperature of roughly 25° C., the samples adsorbed a significant amount of water during the hold periods at temperatures below 50° C. By contrast, the sample heated to 55° C. before exposure to a partial pressure of water showed little or no weight gain due to adsorption of water. This helps to further demonstrate that if a temperature of roughly 50° C. can be reached quickly during heating, the impact of water adsorption on the catalyst can be reduced or minimized.

Figure 10:
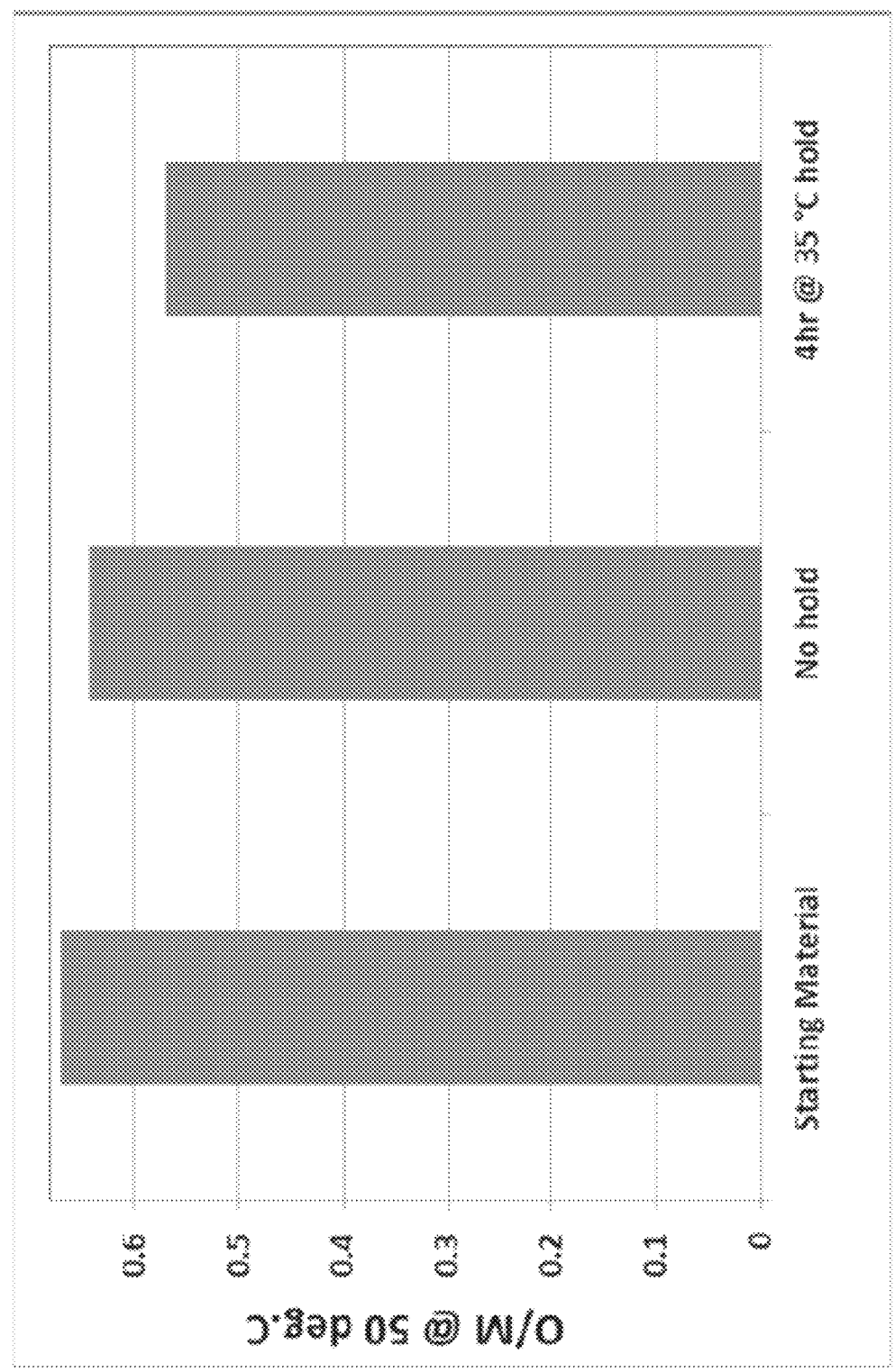
FIG. 10 shows metal dispersion values for catalysts including a noble metal on a siliceous support that were reduced in the presence of a gas stream containing a partial pressure of water.

FIG. 10 provides a further illustration of the importance of reducing the amount of water exposure that occurs at temperatures below 50° C. Using MCM-41 samples with supported Pt and Pd one sample was heated at 15° C./hour, while a second sample was heated to 35° C. and then held for 4 hours at 35° C. before continuing the heating ramp at 15° C./hour. Both samples were exposed to 20.7 kPa of water during the tests. As shown in FIG. 10, the sample without a hold period maintained a dispersion value similar to the dispersion value for the catalyst prior to water exposure, while the catalyst with the hold period had a dispersion value of less than 0.60.

ADDITIONAL EMBODIMENTS

Embodiment 1

A method for activating a noble metal catalyst, comprising: heating a catalyst comprising 0.05 wt % to 5.0 wt % of noble metal on a support comprising a metal oxide in the presence of a gas stream comprising at least 0.7 kPa-a of water, the heating increasing the temperature of the catalyst from a temperature of 40° C. or less to a temperature of 50° C. or more, about 20 mol % or more (or 50 mol % or more) of the metal atoms of the metal oxide comprising silicon, the catalyst comprising a dispersion of 0.60 or more prior to the heating, the heated catalyst comprising a dispersion of 0.60 or more, the gas stream optionally comprising hydrogen, nitrogen, or a combination thereof.

Embodiment 2

The method of Embodiment 1, wherein the support comprises a crystalline metal oxide, about 50 mol % or more of the metal atoms of the crystalline metal oxide comprising silicon, the crystalline metal oxide optionally comprising a zeolite, a mesoporous support material, or a combination thereof.

Embodiment 3

The method of any of the above embodiments, wherein the support further comprises a binder, the binder optionally comprising alumina.

Embodiment 4

The method of any of the above embodiments, wherein the support comprises ZSM-48, MCM-41, or a combination thereof.

Embodiment 5

The method of any of the above embodiments, wherein the heating increases the temperature of the catalyst from a temperature of 30° C. or less to a temperature of 50° C. or more.

Embodiment 6

The method of any of the above embodiments, wherein an exposure time comprises a time from a start of the heating to the catalyst being at a temperature of 50° C., a time-water product for the exposure time being 40 or less, the time-water product being defined as a product of the water partial pressure in kPa and a square root of the exposure time in hours.

Embodiment 7

The method of any of the above embodiments, wherein the catalyst comprises Pt, Pd, or a combination thereof, or wherein the catalyst comprises 0.1 wt % to 1.5 wt % of noble metal, or a combination thereof.

Embodiment 8

The method of any of the above embodiments, wherein the gas stream comprises 3.5 kPa-a of water or more, or 5.0 kPa-a or more, or 10 kPa-a or more; or wherein the gas stream comprises 40 kPa-a or less of water, or 30 kPa-a or less, or 25 kPa-a or less; or a combination thereof.

Embodiment 9

The method of any of the above embodiments, wherein the heating comprises heating the catalyst at a rate of 15° C. per hour or less, or 10° C. per hour or less, or 5° C. per hour or less.

Embodiment 10

The method of any of the above embodiments, wherein the catalyst comprises 1.0 wt % or more of water prior to the heating; or wherein the catalyst comprises catalyst in a catalyst bed of a hydroprocessing reactor; or a combination thereof.

Embodiment 11

The method of any of the above embodiments, further comprising: heating the catalyst from the temperature of 50° C. or more to a temperature of 200° C. or less (or 150° C. or less) in the presence of a gas stream comprising 10.5 kPa-a or less of water (or 4.0 kPa-a or less); and heating the catalyst in the presence of a reducing gas stream comprising at least 5 vol % $H_2$ and 2.0 kPa-a or less of water (or 1.4 kPa-a or less) from the temperature of 200° C. or less (or 150° C. or less) to a temperature of 200° C. to 250° C.

Embodiment 12

A multi-reactor reaction system, comprising: one or more heaters comprising one or more heater inlets and one or more heater outlets, the one or more heater inlets being in fluid communication with a source of a hydrogen-containing gas stream; a plurality of reactors, at least two reactors of the plurality of reactors being in indirect fluid communication with the source of the hydrogen-containing gas stream via at least one heater outlet of the one or more heater outlets, the at least two reactors comprising one or more catalyst beds comprising hydroprocessing catalyst, the hydroprocessing catalyst optionally comprising a noble metal hydroprocessing catalyst.

Embodiment 13

The multi-reactor system of Embodiment 12, wherein the hydroprocessing catalyst comprises a support comprising a metal oxide, and wherein i) about 20 mol % or more of the metal atoms in the metal oxide comprise silicon, ii) the metal oxide comprises a crystalline metal oxide, about 50 mol % or more of the metal atoms of the crystalline metal oxide comprising silicon, or iii) a combination of i) and ii).

Embodiment 14

The multi-reactor system of Embodiment 12 or 13, wherein at least one heater of the one or more heaters further comprises a heater feed inlet and a heater feed outlet, a first reactor of the plurality of reactors being in fluid communication with the heater feed outlet.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for activating a noble metal catalyst, comprising:
heating a catalyst comprising 0.05 wt % to 5.0 wt % of noble metal on a support comprising a metal oxide in the presence of a gas stream comprising at least 0.7 kPa-a partial pressure of water, the heating increasing the temperature of the catalyst from a temperature of 40° C. or less to a temperature of 50° C. or more, about 20 mol % or more of the metal atoms of the metal oxide comprising silicon, the catalyst comprising a metal dispersion of 0.60 or more prior to the heating, the heated catalyst comprising a metal dispersion of 0.60 or more.

2. The method of claim 1, wherein the support comprises a crystalline metal oxide, about 50 mol % or more of the metal atoms of the crystalline metal oxide comprising silicon.

3. The method of claim 2, wherein the crystalline metal oxide comprises a zeolite, a mesoporous support material, or a combination thereof.

4. The method of claim 1, wherein the support further comprises a binder.

5. The method of claim 4, wherein the binder comprises alumina.

6. The method of claim 1, wherein the support comprises ZSM-48, MCM-41, or a combination thereof.

7. The method of claim 1, wherein the heating increases the temperature of the catalyst from a temperature of 30° C. or less to a temperature of 50° C. or more.

8. The method of claim 1, wherein an exposure time comprises a time from a start of the heating to the catalyst being at a temperature of 50° C., a time-water product for the exposure time being 40 or less, the time-water product being defined as a product of the water partial pressure in kPa and a square root of the exposure time in hours.

9. The method of claim 1, wherein the catalyst comprises Pt, Pd, or a combination thereof, or wherein the catalyst comprises 0.1 wt % to 1.5 wt % of noble metal, or a combination thereof.

10. The method of claim 1, wherein the gas stream comprises 3.5 kPa-a of water or more.

11. The method of claim 1, wherein the gas stream comprises 40 kPa-a or less of water.

12. The method of claim 1, wherein the gas stream comprises hydrogen, nitrogen, or a combination thereof.

13. The method of claim 1, wherein the heating comprises heating the catalyst at a rate of 15° C. per hour or less.

14. The method of claim 1, wherein the catalyst comprises 1.0 wt % or more of water prior to the heating.

15. The method of claim 1, wherein the catalyst comprises catalyst in a catalyst bed of a hydroprocessing reactor.

16. A method for activating a noble metal catalyst, comprising:
heating a catalyst comprising 0.05 wt % to 5.0 wt % of noble metal on a support comprising a metal oxide in the presence of a gas stream comprising at least 0.7 kPa-a partial pressure of water, the heating increasing the temperature of the catalyst from a temperature of 40° C. or less to a temperature of 50° C. or more,
heating the catalyst from the temperature of 50° C. or more to a temperature of 200° C. or less in the presence of a gas stream comprising 10.5 kPa-a or less of water; and heating the catalyst in the presence of a reducing gas stream comprising at least 5 vol % $H_2$ and 2.0 kPa-a or less of water, from the temperature of 200° C. or less to a temperature of 200° C. to 250° C.

wherein about 20 mol % or more of the metal atoms of the metal oxide comprising silicon, the catalyst comprising a metal dispersion of 0.60 or more prior to the heating, the heated catalyst comprising a metal dispersion of 0.60 or more.

* * * * *